(12) United States Patent
McCrary (10) Patent No.: US 8,741,206 B2
(45) Date of Patent: Jun. 3, 2014

(54) METHOD AND APPARATUS FOR STRETCH BLOW MOLDING A CONTAINER

(75) Inventor: Robert Ellis McCrary, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 12/956,173

(22) Filed: Nov. 30, 2010

(65) Prior Publication Data

US 2011/0193271 A1    Aug. 11, 2011

Related U.S. Application Data

(60) Provisional application No. 61/302,318, filed on Feb. 8, 2010.

(51) Int. Cl.
*B29C 49/12* (2006.01)

(52) U.S. Cl.
USPC ........... 264/532; 264/534; 264/531; 425/529; 425/530; 425/535

(58) Field of Classification Search
USPC .................. 264/531–532, 534; 425/529–530
See application file for complete search history.

(56) References Cited

U.S. PATENT DOCUMENTS

| | | | | |
|---|---|---|---|---|
| 4,039,271 A * | 8/1977 | Hudson et al. | ........ | 425/529 |
| 4,382,769 A * | 5/1983 | Younkin et al. | ........ | 425/525 |
| 4,785,948 A | 11/1988 | Strassheimer | | |
| 4,808,105 A * | 2/1989 | Linss et al. | ........ | 425/529 |
| 4,867,929 A * | 9/1989 | Albrecht et al. | ........ | 264/521 |
| 4,880,593 A | 11/1989 | Strassheimer | | |
| 4,889,752 A | 12/1989 | Beck | | |
| 5,145,629 A * | 9/1992 | Nilsson | ........ | 264/292 |
| 5,169,705 A | 12/1992 | Coxhead et al. | | |
| 5,352,402 A * | 10/1994 | Orimoto et al. | ........ | 264/526 |
| 5,403,177 A | 4/1995 | Priest | | |
| 5,403,538 A * | 4/1995 | Maeda | ........ | 264/530 |
| 5,454,707 A * | 10/1995 | Mitchell et al. | ........ | 425/524 |
| 5,501,589 A * | 3/1996 | Marcus | ........ | 425/526 |
| 5,578,262 A * | 11/1996 | Marcus | ........ | 264/532 |
| 5,585,065 A | 12/1996 | Nakamaki et al. | | |
| 5,866,175 A | 2/1999 | Latham | | |
| 5,989,661 A | 11/1999 | Krishnakumar et al. | | |
| 6,516,963 B2 | 2/2003 | Mihashi | | |
| 6,730,259 B1 * | 5/2004 | Ikeda et al. | ........ | 264/520 |
| 6,855,289 B2 * | 2/2005 | Krishnakumar et al. | ........ | 264/516 |
| 7,314,380 B2 | 1/2008 | Koda et al. | | |
| 7,754,138 B1 * | 7/2010 | Kashiwase | ........ | 264/534 |
| 7,842,222 B2 * | 11/2010 | Dierickx | ........ | 264/328.1 |
| 8,016,587 B2 * | 9/2011 | Schuster et al. | ........ | 425/535 |
| 8,052,916 B2 * | 11/2011 | Vieillot | ........ | 264/520 |
| 2002/0101010 A1 * | 8/2002 | Vailliencourt | ........ | 264/537 |
| 2003/0102605 A1 * | 6/2003 | Rutenbeck et al. | ........ | 264/531 |
| 2005/0121836 A1 * | 6/2005 | Rutenbeck et al. | ........ | 264/531 |
| 2005/0136149 A1 * | 6/2005 | Krishnakumar et al. | ........ | 425/526 |
| 2005/0161866 A1 | 7/2005 | Batlaw et al. | | |
| 2006/0068048 A1 | 3/2006 | Koda et al. | | |
| 2006/0290035 A1 | 12/2006 | Yoshiike et al. | | |
| 2009/0160102 A1 * | 6/2009 | Schuster et al. | ........ | 264/532 |
| 2009/0246428 A1 * | 10/2009 | Shimizu et al. | ........ | 428/35.7 |
| 2013/0106028 A1 * | 5/2013 | Lisch et al. | ........ | 264/532 |

\* cited by examiner

*Primary Examiner* — Joseph S Del Sole
*Assistant Examiner* — Nahida Sultana
(74) *Attorney, Agent, or Firm* — William K. McGreevey (57) ABSTRACT

An improved stretch rod tip having a hollowed area for receipt of a portion of a preform and at least a portion of a sprue during stretch blow molding of a container. Upon hardening of the container, the received portion of the preform becomes a protective dome over the received portion of the sprue that is at least partially internal to the container and that greatly reduces cracking, shearing, or other fracturing of the container due to a drop impact.

20 Claims, 12 Drawing Sheets

METHOD AND APPARATUS FOR STRETCH BLOW MOLDING A CONTAINER

RELATED APPLICATIONS

This application claims the priority benefit of U.S. Provisional Patent Application Ser. No. 61/302,318, filed Feb. 8, 2010.

BACKGROUND

1. Field of the Invention

Embodiments of the present invention are generally directed to a method and apparatus for stretch blow molding a container, such as a bottle. More particularly, embodiments of the present invention are directed to a tip for a stretch rod used during stretch blow molding that provides improved drop impact characteristics for the molded container.

2. Description of the Related Art

Figure 1:
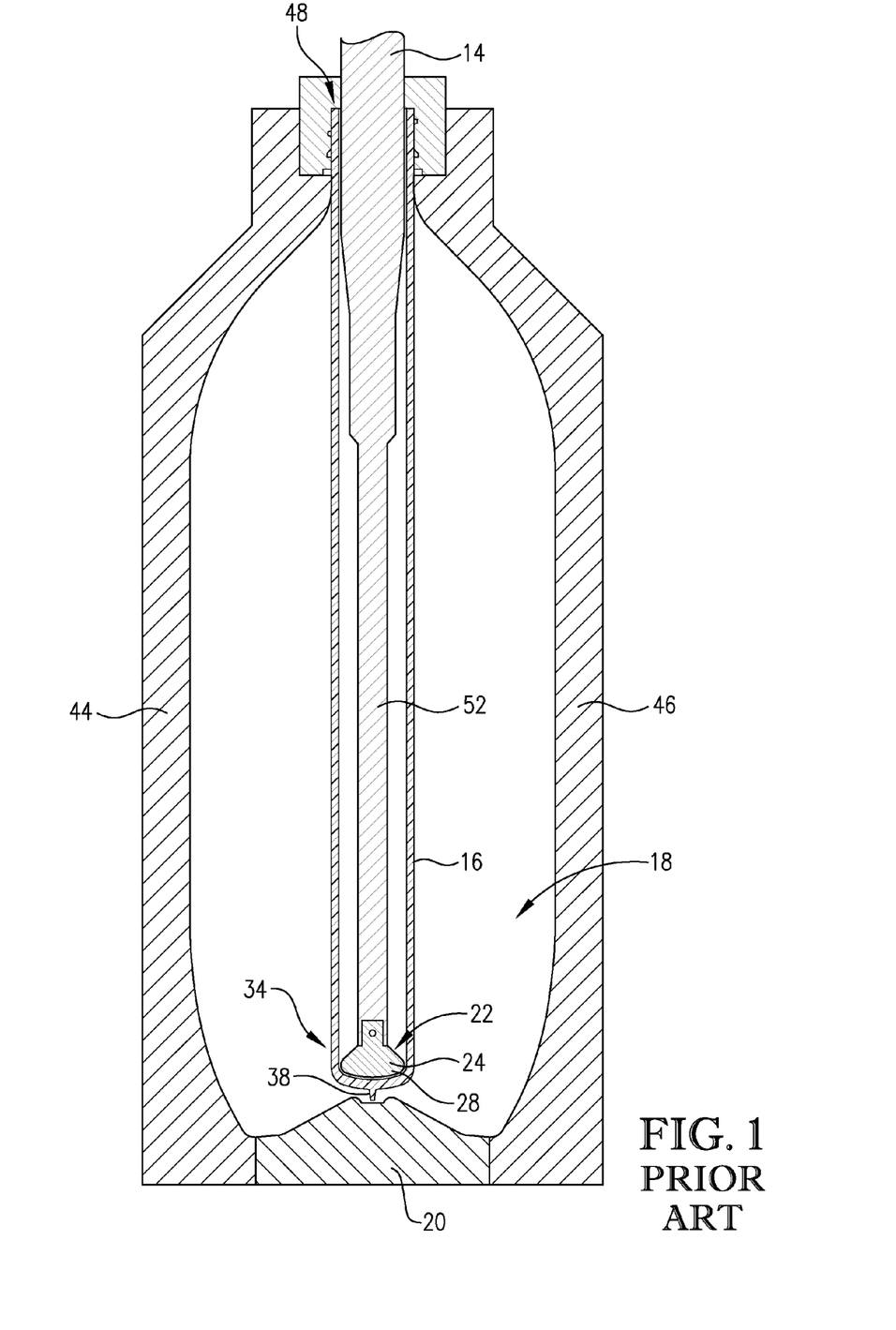
FIG. 1 is a vertical cross-sectional view of a blow mold used in stretch blow molding of a container and further illustrating a preform inserted within the blow mold and a stretch rod inserted within the preform, wherein the stretch rod includes a stretch rod tip having a rounded lower end, as is known in the art.
Figure 2:
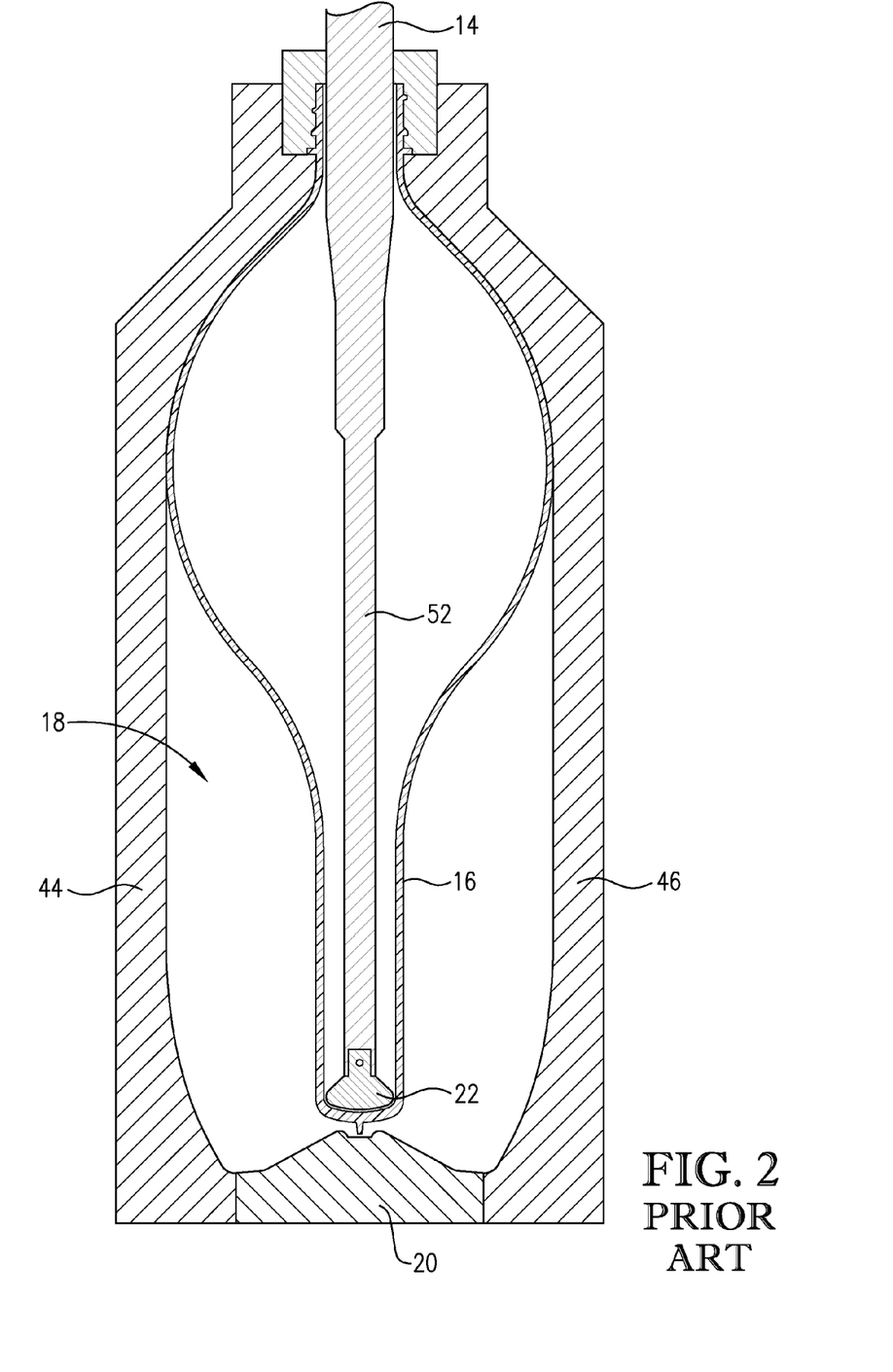
FIG. 2 is the blow mold of FIG. 1 and illustrating the preform partially blown outwards so as to mold to a shape of the container.
Figure 3:
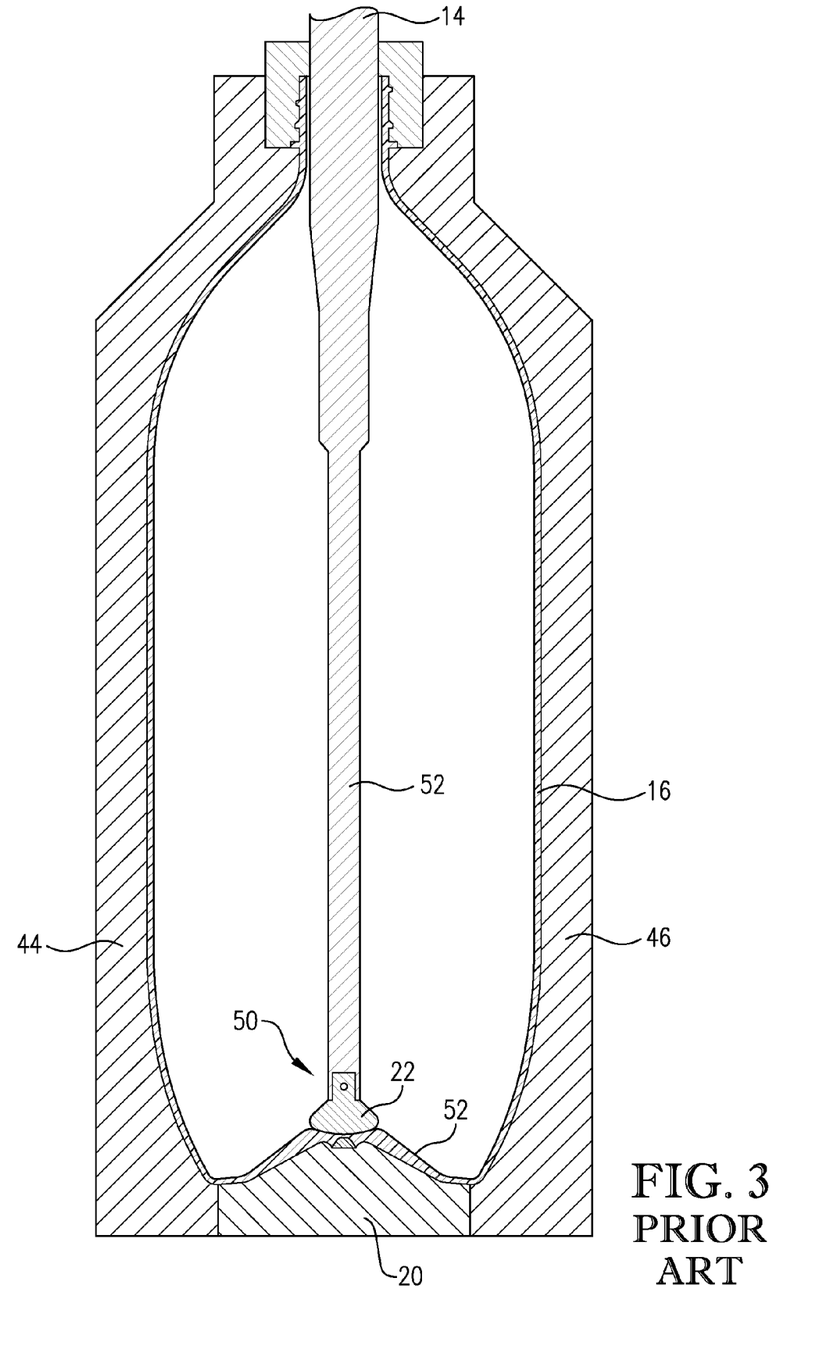
FIG. 3 is the blow mold of FIGS. 1 and 2 and illustrating the preform completely blown outwards so as to mold to the shape of the container.

Stretch blow molding of containers generally comprises a first step of injection molding a preform made of a heat-softened amorphous polymer or other suitable material, and a second step of stretching and blowing the preform in a blow mold to form the final container. FIGS. 1-3 illustrate an exemplary blow mold 18 comprising a blow mold base 20 and left and right sides 44,46. As is known in the art, the blow mold 18 substantially mirrors an external shape of the container being molded. After the stretch blow molding is complete and the container is formed, the blow mold base 20 is vertically moved away from the formed container, and the left and right sides 44,46 of the mold 18 are horizontally moved away from the container.

Referring to FIGS. 1-3, the second step of stretch blow molding generally comprises inserting a stretch rod 14 into a neck 48 of the preform 16 (FIG. 1), generally centering the preform 16 on the stretch rod 14, stretching the preform 16 with the stretch rod 14, and injecting pressurized air into the preform 16 to force it to mold to the shape of the blow mold 18 (FIGS. 2-3).

The stretch rod 14 commonly includes a tip 22 at a general lower end 50 of a body 52 of the stretch rod 14. The tip 22 has a main body 24, and a lower end 28 of the body 24 is either flat or slightly rounded, as illustrated in FIG. 1. The tip 22 of the prior art stretch rod 14 is thus substantially blunt, which, as described below, introduces locations of potential failure to the molded container.

In more detail, the injection molded preform 16 commonly includes a sprue 38, illustrated in FIG. 1, which is formed at the lower end 34 of the preform 16 from an opening in the injection mold. In some stretch blow molding processes, such as injection stretch blow molding ("ISBM"), the sprue 38 is left intact prior to stretch blow molding. During the stretch blow molding process, the blunt tip 22 of the stretch rod 14 flattens or compresses the sprue 38 against the blow mold base 20, as illustrated in FIGS. 2-3. This method of accounting for the sprue 38 leaves a notch on an outside surface of the molded container that is aesthetically unpleasing, undesirably catches on clothing or other items, and presents a weakened area susceptible to fracture, cracking, shearing, or other failure during a drop impact.

In other stretch blow molding processes, such as reheat-blow ("RHB"), the sprue 38 is trimmed prior to blow molding. However, after the container is fully molded, remnants of the sprue form a rough notch on the outside surface of the container. As with ISBM, the notch presents a weakened area susceptible to fracture during a drop impact.

Accordingly, there is a need for an improved apparatus and method for stretch blow molding containers with reduced drop impact failure. More particularly, there is a need for an apparatus and method that does not severely compress and flatten the sprue so as to leave a notch on the outside of the molded container that is susceptible to drop impact failure. Further, there is a need for an apparatus and method of improving drop impact failure that can be implemented without significant additional cost or changes to the blow mold.

SUMMARY OF EMBODIMENTS OF THE PRESENT INVENTION

Embodiments of the present invention provide an improved tip for a stretch rod used during stretch blow molding of a preform to be molded into a container. The preform commonly includes at least a portion of a sprue on a general lower end thereof. The improved stretch rod tip comprises a body having a lower end and an upper end, a connector at the general upper end of the body and operable to connect the tip to the stretch rod, and a hollowed area at the general lower end of the body and configured for receiving a portion of the preform and at least a portion of the sprue during the stretch blow molding.

During stretch blow molding of the container, the stretch rod tip presses the preform, which is heat softened, against a base of a blow mold. As the tip presses down against the preform, the hollowed area of the tip receives a portion of the preform and a portion of the sprue therein, such that the portion of the preform received within the hollowed area drapes over and protects the portion of the sprue received within the hollowed area. Thus, a dome comprising the portion of the preform and the portion of the sprue received in the hollowed area is formed at least partially internal to the molded container. To accommodate the preform and the sprue, a volume of the hollowed area of the tip is preferably greater than a volume of the combined portion of the preform and the sprue received within the hollowed area. In preferable embodiments of the present invention, the volume of the hollowed area is at least 5 percent greater than the volume of the combined portion of the preform and the sprue received within the hollowed area.

Embodiments of the present invention thus account for the sprue by forming a bottom of the molded container partially around the sprue. Unlike the prior art, where the sprue is flattened on the outside of the container, and thus presents a weakened area susceptible to drop impact failure, the sprue of the molded container remains generally intact. The sprue is not severely flattened or compressed against the blow mold base, but rather, the received preform drapes over the received sprue so that the received sprue is at least partially internal to the container. Thus, the area surrounding the sprue in the completed, molded container is substantially flat, as opposed to a notch formed from an exposed, flattened sprue. This results in a significant reduction in flexural stress and drop impact failure.

Embodiments of the present invention provide for reduced drop impact failure without requiring reshaping of the container base, which would require a different blow mold base and therefore, an expensive modification. Embodiments of the present invention can also be used with varying shapes for the blow mold base so that the hollowed area of the stretch rod tip operates in conjunction with the particular blow mold base to provide improved drop impact or aesthetic characteristics.

It is also notable that simply modifying the blow mold base with a concave dome does not provide the same advantages as embodiments of the present invention. In particular, an initial stretch ratio of the preform is not affected by use of embodiments of the present invention. In contrast, if a concave dome was added to the blow mold base, the stretch ratio of the preform would be affected, and the material for the preform would then have to be modified, in addition to the blow mold base itself. Use of the present invention only requires a modification of the stretch rod tip, which is relatively inexpensive and easier to retool.

DETAILED DESCRIPTION

Turning now to the drawing figures, and particularly FIGS. 4-9, a method and apparatus 10 for stretch blow molding of containers, such as bottles, is illustrated. The apparatus 10 comprises a stretch rod 14 for stretching and centering an injection molded preform 16 in a blow mold 18, and, more particularly, in pressing and securing the preform 16 against a base 20 of the blow mold 18 during the stretch blow molding. Embodiments of the present invention provide the stretch rod 14 with a stretch rod tip 22 having a main body 24 including an upper end 26 and a lower end 28. A connector 30 for removably connecting the tip 22 to the stretch rod 14 is secured to or integral with the upper end 26 of the body 24. The lower end 28 of the tip's body 24 is provided with a hollowed area 32 configured to receive, during the stretch blow molding, a portion of a lower end 34 of the preform 16 (hereinafter the "received preform" 36) and at least a portion of a sprue 38 (hereinafter the "received sprue" 40) fixedly depending from the lower end 34 of the preform 16. Upon hardening of the container 12, the received preform 36 becomes a protective dome 42 over the received sprue 40 that is at least partially internal to the container 12 and that greatly reduces cracking, shearing, or other fracturing of the container 12 due to a drop impact.

To stretch blow mold the container, the preform 16 can first be formed via injection molding. The preform 16 may be made of any plastic or plastic blend that can be subjected to stretch blow molding, such as, for example, polycarbonate, PET, copolyesters, for example, including but not limited to, PETG, PCTG, and/or copolyesters comprising 2,2,4,4-tetramethyl-1,3-cyclobutanediol/cyclohexanedimethanol, polystyrene, acrylic, polypropylene, polysulfone, and other amorphous polymers.

As is known in the art, the injection molded preform 16 commonly includes the sprue 38, which is formed at the lower end 34 of the preform 16 from an opening in an injection mold (not shown). As can be appreciated, a diameter of the sprue 38 is dependent on a size of the container to be molded. For large containers, the sprue's diameter can be as large as 7 mm. Embodiments of the present invention can accommodate any sprue diameter, however.

As noted above, the sprue 38 is either trimmed so as to leave a remnant or remains intact during the stretch blow molding. Embodiments of the present invention are configured for use with either a trimmed or intact sprue 38. Therefore, use of the term "sprue" herein shall refer to both remnants of a sprue 38 or a wholly intact sprue 38.

After injection molding of the preform 16, the stretch rod is inserted into a neck 48 of the preform 16, as illustrated in FIG. 1. At this time, the preform is heat-softened and is easily pliable for the stretching and blow molding process. As the preform 16 is stretched, the tip 22 of the stretch rod 14, which is provided at a lower end 50 of a stretch rod body 52, contacts the lower end 34 of the preform 16 and presses it against the blow mold base 20, as illustrated in FIG. 3. Thus, the stretch rod tip 22 assists in molding a bottom of the container.

Figure 10:
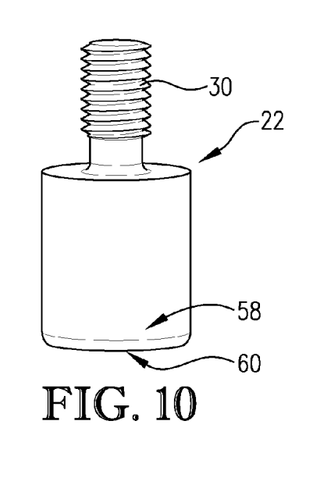
FIG. 10 is a perspective view of the stretch rod tip illustrated in FIGS. 4-6.
Figure 12:
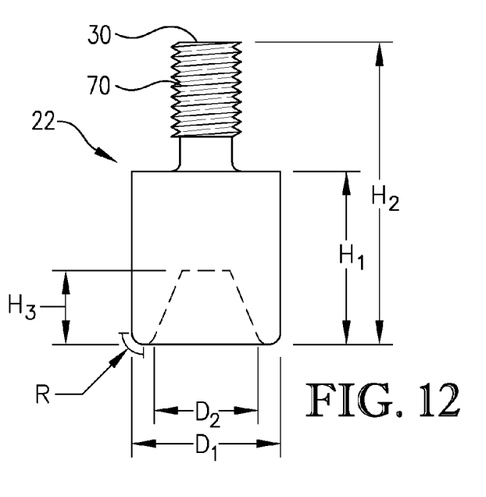
FIG. 12 is a schematic, cross-sectional view of the stretch rod tip of FIG. 11 and illustrating various dimensions of the tip.
Figures 13, 14:
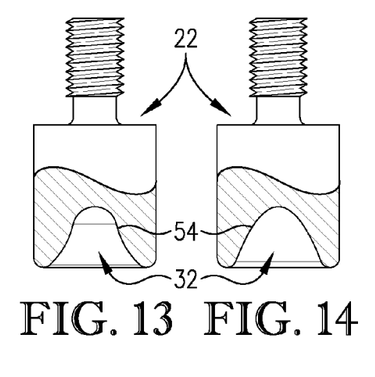
FIGS. 13-19 are fragmentary, cross-sectional views of stretch rod tips of alternative embodiments of the present invention, with each FIGURE illustrating a hollowed area of the tip having a generally curvilinear interior wall.
Figures 15, 16:
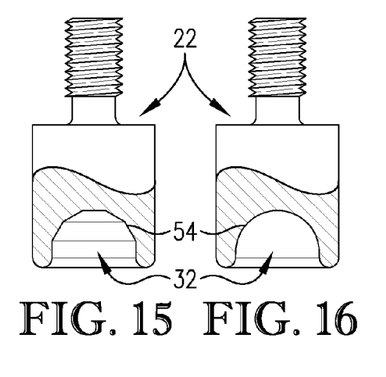
Figures 17, 18:
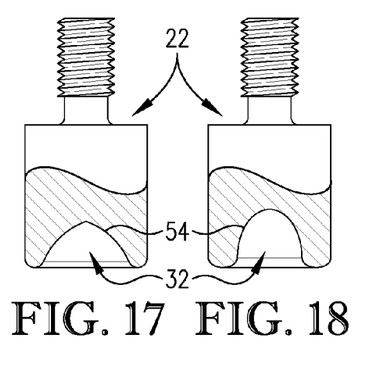
Figure 19:
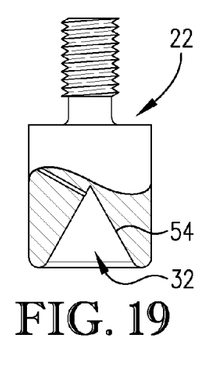
Figures 20, 21:
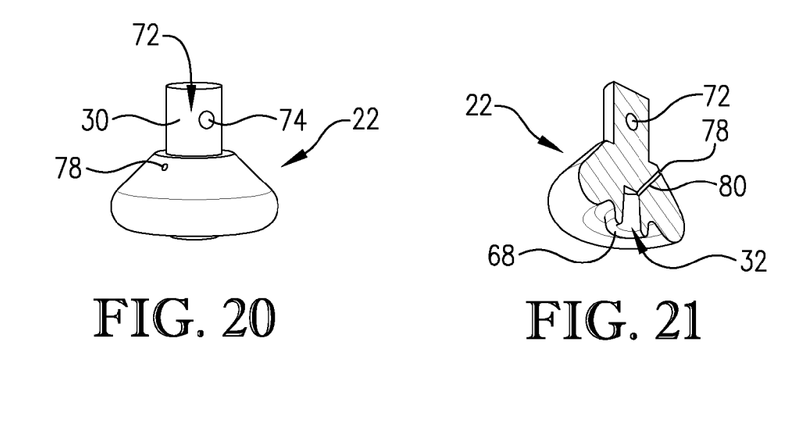
FIG. 20 is a perspective view of the stretch rod tip illustrated in FIGS. 7-9.
FIG. 21 is a vertical, cross-sectional view of the stretch rod tip of FIG. 20 and further illustrating a vent connecting a hollowed area of the stretch rod tip to atmosphere.
Figure 22:
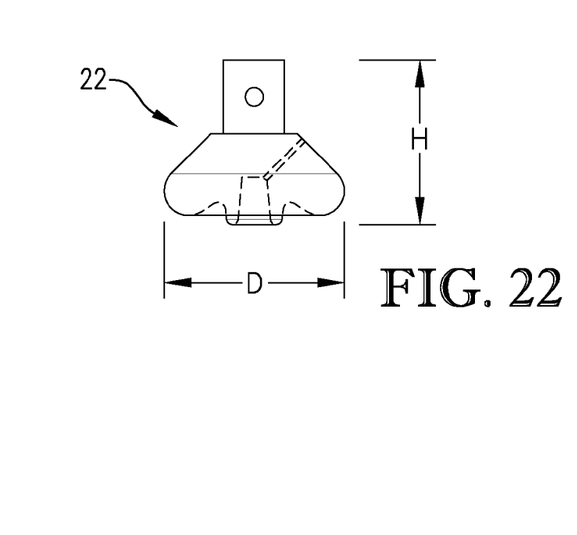
FIG. 22 is a schematic, cross-sectional view of the stretch rod tip of FIG. 21 and illustrating various dimensions of the tip.

Although embodiments of the present invention can be used with any shape of stretch rod tip 22, the stretch rod tip 22 is usually generally circular (see FIGS. 10 and 20). Referring to FIG. 12 and as can be appreciated, a diameter D and heights $H_1$ and $H_2$ of the stretch rod tip 22 are commonly dependent on a finished size, and in some instances shape, of the bottom of the molded container. FIGS. 12-19 and 22 illustrate exemplary shapes and sizes for the stretch rod tip 22. For example, FIG. 12 illustrates a stretch rod tip 22 useful for many containers, such as sports bottles, pharmaceutical containers, food and beverage containers, etc. FIGS. 20-22 illustrate a stretch rod tip 22 useful to mold baby bottles.

Referring to FIGS. 12 and 22, for most molded containers, a diameter $D_1$ of the stretch rod tip 22 can be in the range of 0.5 mm to 35 mm, in the range of 8 mm to 25 mm, or in the range of 10 mm to 20 mm. Additionally, a height $H_1$ of the stretch rod tip 22 can be in the range of 5 mm to 50 mm, in the range of 10 mm to 30 mm, or in the range of 15 mm to 25 mm. A height $H_2$ of the tip's body 24 can be in the range of 5 mm to 50 mm, in the range of 10 mm to 20 mm, or in the range of 12 mm to 18 mm. However, it is to be understood that depending on the size of the container being molded, the diameter $D_1$ and heights $H_1$ and $H_2$ of the tip 22 may vary. It is also to be understood that embodiments of the present invention can be used with any diameter and shape of stretch rod tip 22, and that the shapes of the stretch rod tips 22 illustrated in the drawing figures are for exemplary purposes only.

Figure 11:
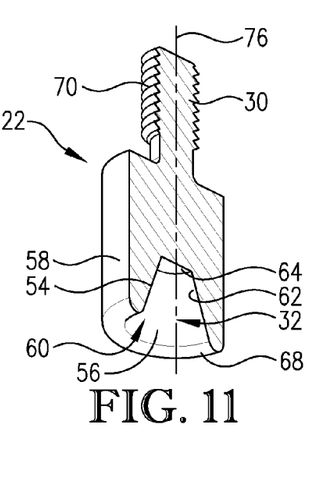
FIG. 11 is a vertical cross-sectional view of the stretch rod tip of FIG. 10.

Embodiments of the present invention provide for the stretch rod tip 22 to include the hollowed area 32, as discussed above. Referring to FIGS. 11-12, the hollowed area 32 is defined by an interior wall 54 having an inner face 56 and an outer face 58. A general bottom 60 of the hollowed area 32 remains open to receive the combined received preform 36 and the received sprue 40. The hollowed area 32 can have a diameter $D_2$ in the range of 1 mm to 30 mm, in the range of 5 mm to 25 mm, or in the range of 12 mm to 18 mm. The hollowed area 32 can have a height $H_3$ in the range of 1 mm to 30 mm, in the range of 4 mm to 15 mm, or in the range of 6 mm to 10 mm. The hollowed area 32 can have a ratio of the height $H_3$ of the hollowed area to the diameter $D_2$ of the hollowed area can be at least 0.35:1, at least 0.4:1, at least 0.5:1, at least 0.6:1, at least 0.7:1, at least 0.8:1, at least 0.9:1, or at least 1:1. This ratio of the hollowed area's 32 height $H_3$ to diameter $D_2$ can be sufficiently large to ensure that during blow molding, the entire volume of the hollowed area 32 is not filled with the material being molded.

Figure 6:
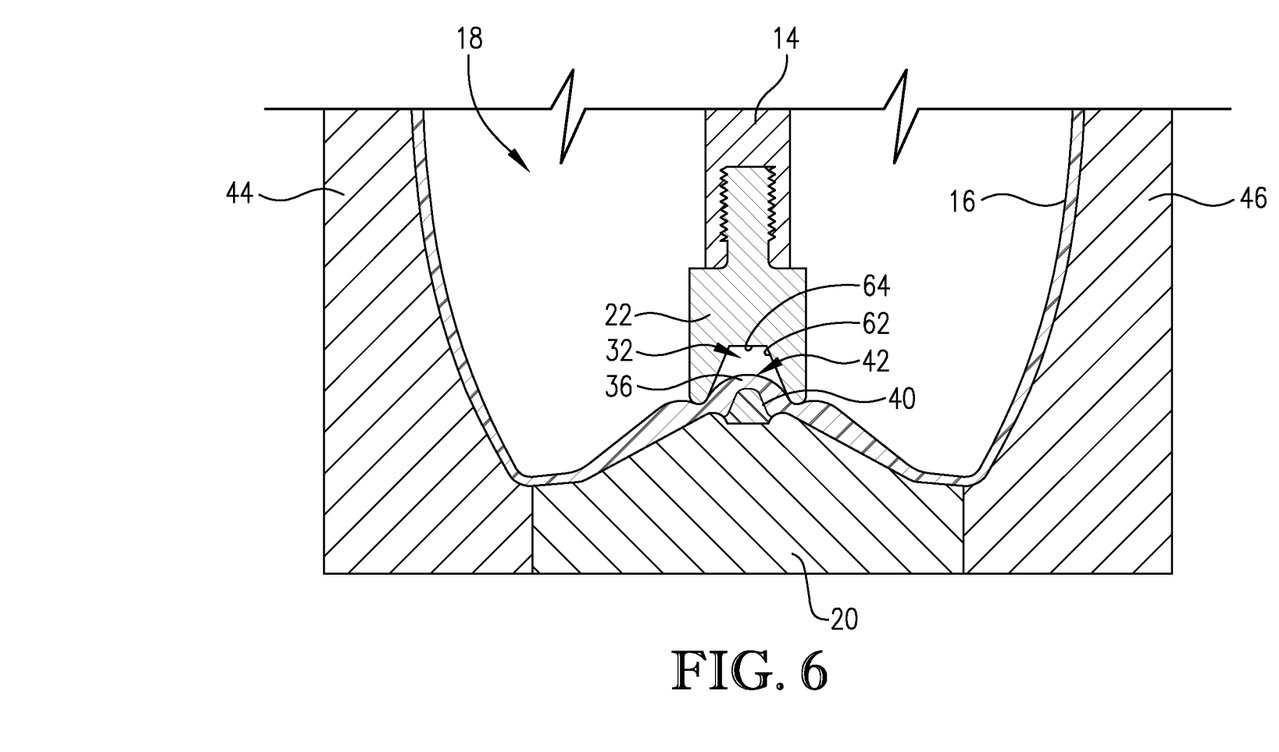
FIG. 6 is the blow mold base of FIGS. 4 and 5 and illustrating the stretch rod tip pressed down against the preform and overlying the sprue, such that a portion of the preform and at least a portion of the sprue are received within the stretch rod tip.
Figure 9:
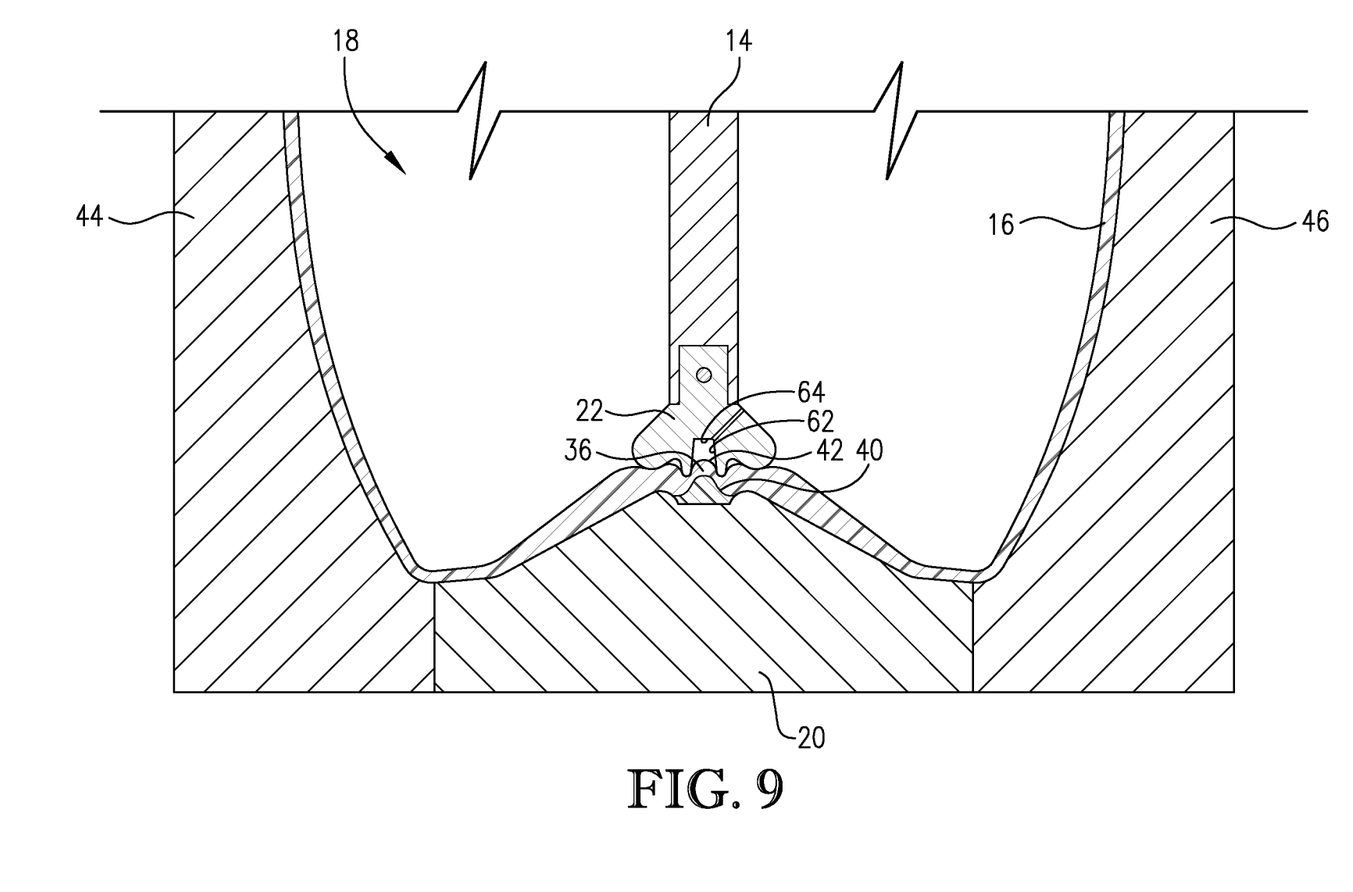
FIG. 9 is the blow mold base of FIGS. 6 and 7 and illustrating the stretch rod tip pressed down against the preform and overlying the sprue, such that a portion of the preform and at least a portion of the sprue are received within the stretch rod tip.

FIGS. 6, 9, and 13-19 illustrate exemplary shapes of the hollowed area 32, including the interior wall 54. In FIGS. 6 and 9, the interior wall 54 is formed by a circumferential side wall 62 and a substantially planar upper wall 64. In contrast, FIGS. 13-19 illustrate a variety of interior walls 54 that are generally curvilinear and concave. Therefore, it is to be understood that the interior wall 54 of the hollowed area 32 may be one of a variety of shapes.

A bottom 66 of the interior wall 54 defines a rim 68 that presses against the preform 16 during the stretch blow molding and, as discussed in more detail below, assists in compressing the received preform 36 and the received sprue 40 into the hollowed area 32. In some tip shapes, the outer face 58 of the interior wall 54 defines the diameter of the tip 22, as illustrated in FIGS. 6 and 11. In other tip shapes, as illustrated in FIG. 9, the rim 68 is an intermediate wall of the tip 22.

Referring to FIGS. 12-19, the rim 68 can be rounded or tapered so as to facilitate pressing of the rim 68 into the softened preform 16. It is preferable that the rim 68 is not so angled as to penetrate the preform 16. To accomplish the desired pressing of the preform 16 without actual penetration of the preform 16, the rim 68 can have a radius of curvature R in the range of 0.1 mm to 2.0 mm, in the range of 0.2 mm to 1.0 mm, or in the range of 0.4 mm to 0.8 mm.

Figure 7:
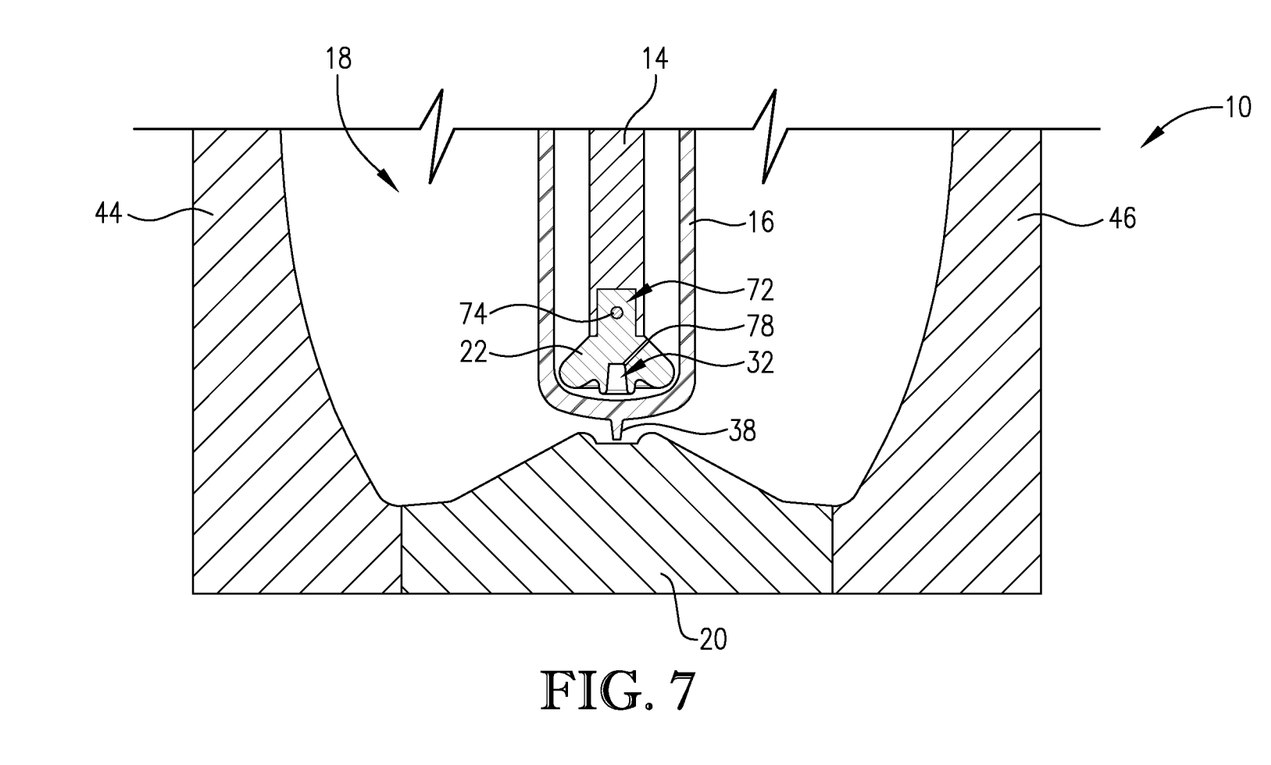
FIG. 7 is a fragmentary, vertical cross-sectional view of a blow mold base and further illustrating a stretch rod tip of other embodiments of the present invention inserted within a preform and a sprue fixedly depending from the preform.

The stretch rod tip 22 is removably coupled to the stretch rod 14, as illustrated in FIGS. 7 and 10. Therefore, varying shaped tips 22 can be removably interchanged with the same stretch rod 14 depending on the container to be molded. As noted above, the upper end 26 of the stretch rod tip 22 is provided with the connector 30 for removably connecting the tip 22 to the stretch rod 14. FIG. 10 illustrates a suitable connector 30 comprising a plurality of male threads 70 operable to mate with a plurality of female threads (not shown) provided on an inside of the stretch rod 14. FIG. 7 illustrates a pin and hole arrangement 72, wherein the stretch rod 14 and the connector 30 are provided with openings (not shown) through which a pin 74 is inserted to removably connect the stretch rod 14 and tip 22 together.

As illustrated in FIGS. 11-12, the lower portion of the inner face 56 of the interior wall 54, which is adjacent the rim 68, can be angled or tapered so as to facilitate release of the received preform 36 and the received sprue 40 from the hollowed area 32. In embodiments of the present invention, the lower portion of the inner face 56 of the interior wall 54 can be angled in the range of 5° to 75° with respect to a vertical axis 76 of the tip 22, in the range of 10° to 60° with respect to the vertical axis 76, or in the range of 15° to 45° with respect to the vertical axis 76. As can be appreciated, the angle of the lower portion of the inner face 56 of the interior wall 54 may also be dependent on a volume of the received preform 36 and the received sprue 40, the preform 16 material, the heat of the preform 16, and other manufacturing parameters.

The hollowed area 32 of the tip 22 is preferably sized to accommodate the received preform 36 and the received sprue 40 while still leaving a portion of a volume of the hollowed area 32 "unfilled," as described in more detail below. Thus, as can be appreciated, a minimum diameter and a minimum volume of the hollowed area 32 are dependent on a size of the preform 16 and the sprue 38. Generally, the larger the container being molded, the larger the preform 16 and the sprue 38.

As noted above, the volume of the hollowed area 32 is preferably sufficiently large to allow the received preform 36 and the received sprue 40 to be received within the hollowed area 32, but without contacting the upper wall 64 of the hollowed area 32. As such, the interior wall 54 of the hollowed area 32 only partially contacts the dome 42 formed from the received preform 36 and the received sprue 40. Therefore, during molding, the volume of the combined received preform 36 and the received sprue 40 is less than the volume of the hollowed area 32. In embodiments of the present invention, the volume of the combined received preform 36 and the received sprue 40 can be in the range of 10% to 99% of the volume of the hollowed area 32, in the range of 20% to 95% of the volume of the hollowed area 32, or in the range of 25% to 90% of the volume of the hollowed area 32. In FIGS. 6 and 9, the volume of the combined received preform 36 and the received sprue 40 is approximately 30% of the volume of the hollowed area 32.

Conversely, the volume of the hollowed area 32 is greater than the volume of the received preform 36 and the received sprue 40. In embodiments of the present invention, the volume of the hollowed area 32 can be in the range of 1% to 90% greater than the volume of the combined received preform 36 and the received sprue 40, in the range of 5% to 80% greater than the volume of the combined received preform 36 and the received sprue 40, or in the range of 10% to 75% greater than the volume of the combined received preform 36 and the received sprue 40.

The relationship of the combined received preform 36 and the received sprue 40 within the hollowed area 32 can also be defined as the height $H_3$ of the hollowed area 32 with respect to a height of the combined received preform 36 and received sprue 40. In particular, the height $H_3$ of the hollowed area 32 of the stretch rod tip 22 of embodiments of the present invention is greater than the height of the combined received preform 36 and received sprue 40. In more detail, the height $H_3$ of the hollowed area 32 can be in the range of 10% to 99% greater than the height of the combined received preform 36 and received sprue 40, in the range of 20% to 95% greater than the height of the combined received preform 36 and received sprue 40, or in the range of 25% to 90% greater than the height of the combined received preform 36 and received sprue 40.

Figure 4:
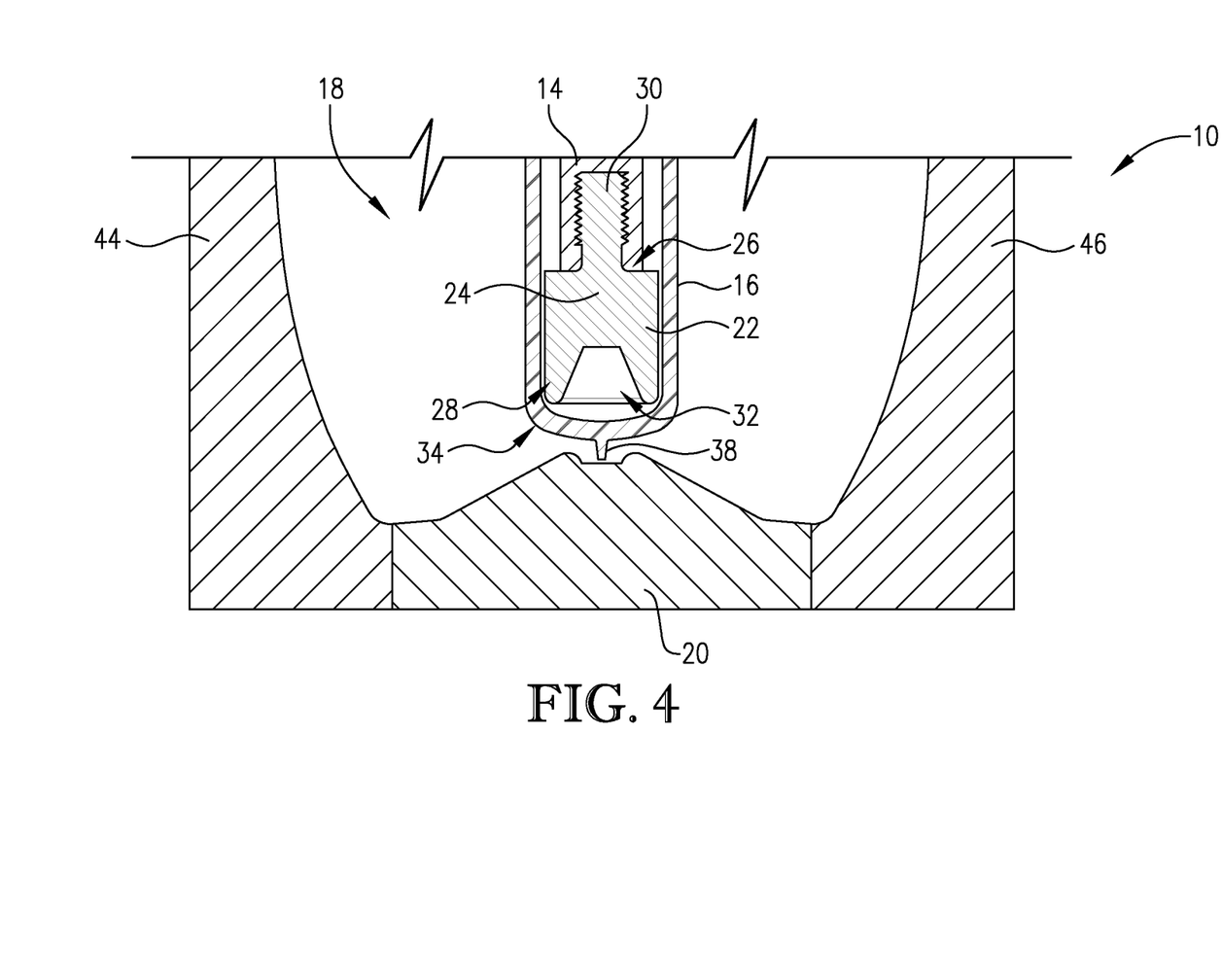
FIG. 4 is a fragmentary, vertical cross-sectional view of a blow mold base and further illustrating a stretch rod tip of embodiments of the present invention inserted within a preform and a sprue fixedly depending from the preform.
Figure 5:
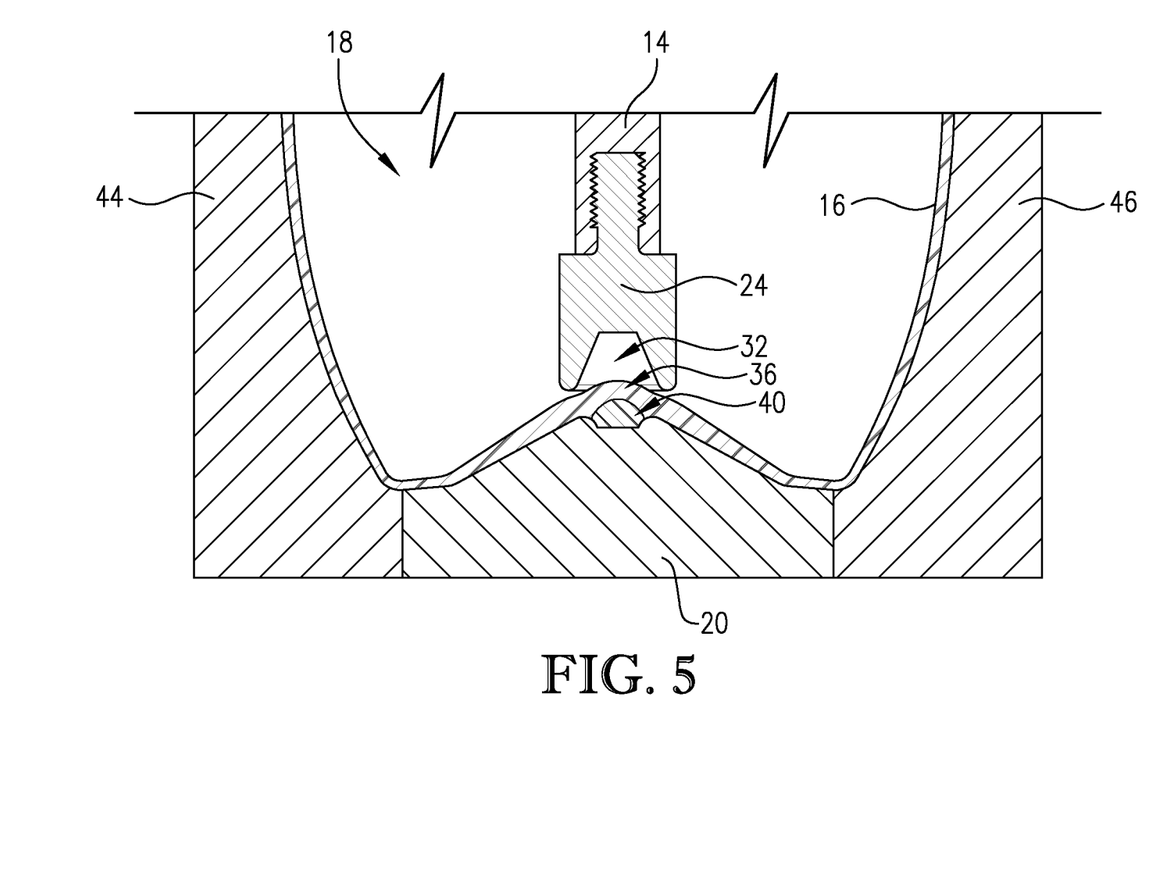
FIG. 5 is the blow mold base of FIG. 4 and illustrating the stretch rod tip beginning to press down against the preform.
Figure 8:
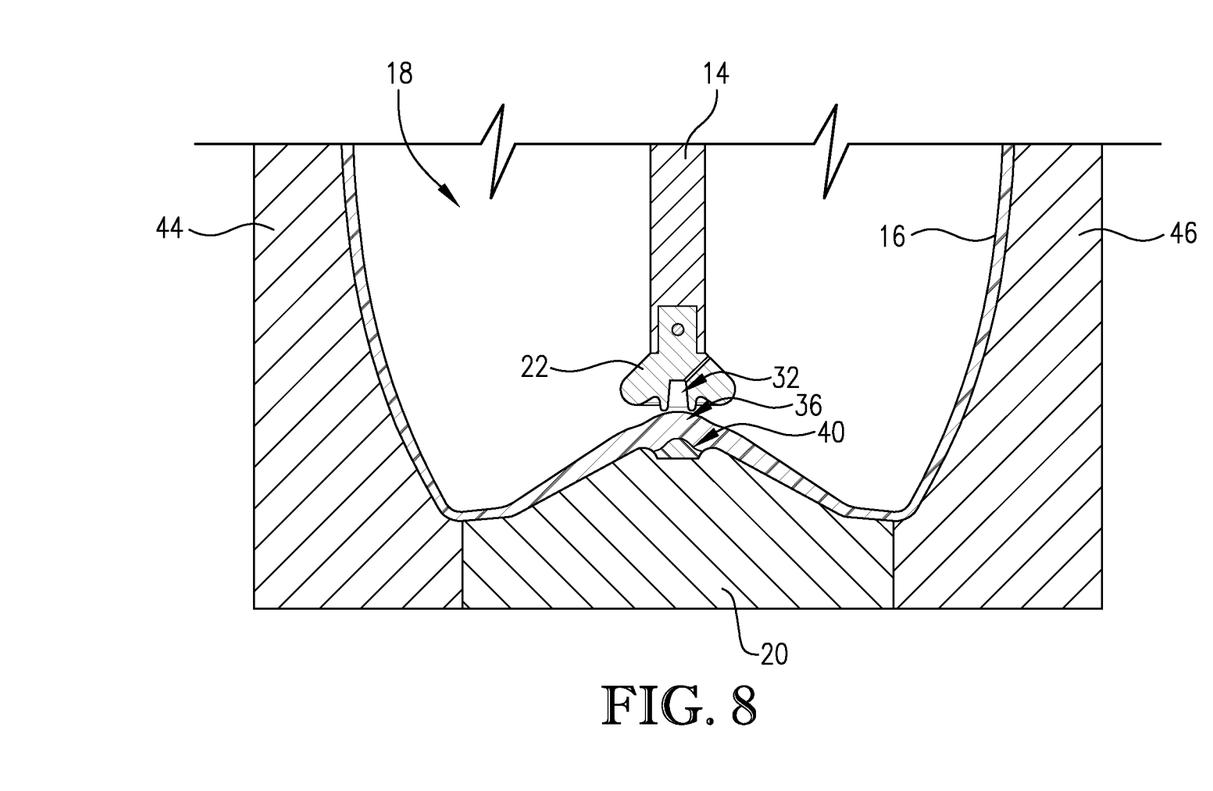
FIG. 8 is the blow mold base of FIG. 7 and illustrating the stretch rod tip beginning to press down against the preform.

As illustrated in FIGS. 4 and 7, immediately prior to the stretch rod tip 22 being pressed against the blow mold base 20, the stretch rod tip 22 is centered over the lower end 34 of the preform 16, and the lower end 34 of the preform 16 is generally centered over the sprue 38 fixedly depending from the preform 16. Referring to FIGS. 5 and 8, as the stretch rod tip 22 presses down against the preform 16, the hollowed area 32 defined by the rim 68 receives a portion of the preform 16 therein, i.e. receives the received preform 36. As the tip 22 continues to press down against the blow mold base 20, at least a portion of the sprue 38 (i.e., the received sprue 40) is also received into the hollowed area 32, such that the received preform 36 drapes over the received sprue 38, as illustrated in FIGS. 5 and 8. Because the preform 16 is still heat-softened, the rim 68 assists in pushing a portion of the preform 16 surrounding the rim 68 outwards and away from the hollowed area 32 of the tip 22. This further allows for the dome 42, comprising the received preform 36 and the received sprue 40, to be formed in the hollowed area 32. Once the container is completely formed, the received sprue 40 is positioned at least partially internal to the molded container and away from the container surface, which significantly reduces flexural stress upon drop impact.

EXAMPLES

Applicant undertook testing of the hollowed tip of embodiments of the present invention on various container base shapes. All containers were molded bottles made from a preform comprising a copolyester containing 100 mole % terephthalic acid, 23 mole % 2,2,4,4-tetramethyl-1,3-cyclobutanediol and 77 mole % 1,4-cyclohexanedimethanol where the total mole % of dicarboxylic acid equals 100 mole % and the total mole % of glycols equals 100 mole %.

For Examples 1, 2 and 3, the formed bottles had a 355 ml nominal capacity, 45 g weight, and 28 mm finish. The bottles were formed on reheat blow equipment using 2 liter CSD style preforms. The sprues on each preform were trimmed to approximately 6.4 mm prior to stretch blow molding. Each of the stretch rod tips used was formed of stainless steel. For each example, bottles were formed using both the prior art stretch rod tip having a slightly rounded bottom ("Tip 1") and the stretch rod tip of embodiments of the present invention having the hollowed area ("Tip 2"). All bottles were drop-tested with additional water mass held in place above the bottle opening by a vertical, thin-walled plastic tube attached by a threaded plastic coupling to the bottle finish. The additional water mass acted freely upon the water already in the filled bottle upon impact so as to provide additional force that would be illustrative of a much larger and, therefore, more vulnerable, bottle. The additional water mass acting upon the bottle was approximately 440 g.

For Example 4, the bottles had a 380 ml nominal capacity, 48 g weight, and 53 mm finish. The bottles were formed on injection stretch blow molding equipment using a custom preform designed for the bottle. The sprues on each preform were left intact as molded, with a length of approximately 5 mm. Each of the stretch rod tips used was formed of aluminum. Bottles were formed using both the prior art stretch rod tip ("Tip 1") and the stretch rod tip of embodiments of the present invention having the hollowed area ("Tip 2"). In Example 4, "Tip 2" had the general shape illustrated in FIG. 21. All bottles were drop-tested using only the combined mass of the water-filled bottle and its cap.

Figure 23:
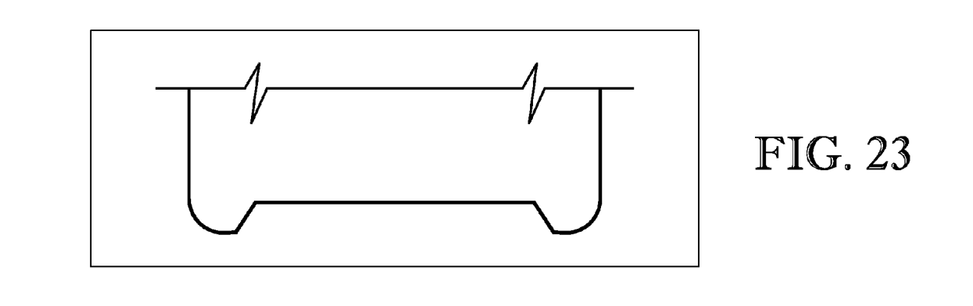
FIG. 23 is a schematic, cross-sectional view of a blow mold base used for comparative testing of prior art stretch rod tips to the stretch rod tip of FIGS. 4-6 of the present invention, the results of which are set forth in Example 1.

For Example 1, the blow mold base 20, illustrated in FIG. 23, was generally flat with a central recess. Five bottles were formed using Tip 1, and six bottles were formed using Tip 2. For the five bottles formed using Tip 1, each bottle was dropped once from a vertical distance of approximately 1.2 m. Cracks formed around the sprue area. For the six bottles formed using Tip 2, each bottle was dropped once from a vertical distance of approximately 3 m. No cracks formed around the sprue area.

Figure 24:
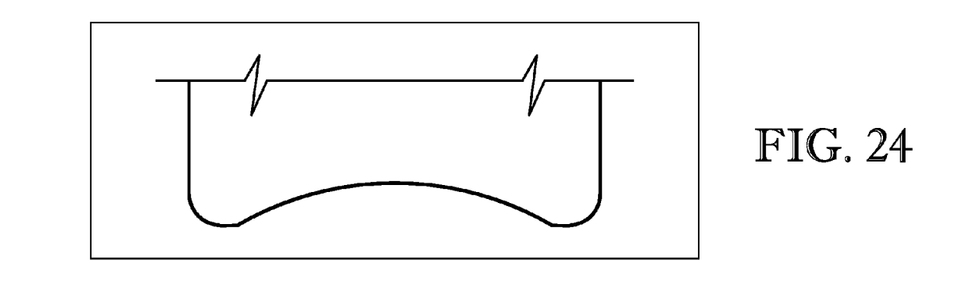
FIG. 24 is a schematic, cross-sectional view of a blow mold base used for comparative testing of prior art stretch rod tips to the stretch rod tip of FIGS. 4-6 of the present invention, the results of which are set forth in Example 2.

For Example 2, the blow mold base 20, illustrated in FIG. 24, included a shallow, spherical dome. Twenty bottles were formed using each of Tips 1 and 2. The bottles were tested according to the Bruceton Staircase Method, ASTM D2463 to determine an $F_{50}$ failure height. For the twenty bottles formed using Tip 1, the bottles had an average $F_{50}$ of approximately 1.4 m. For the twenty bottles formed using Tip 2, the bottles had an average $F_{50}$ of at least approximately 3 m, which is the limit of the drop test apparatus used.

Figure 25:
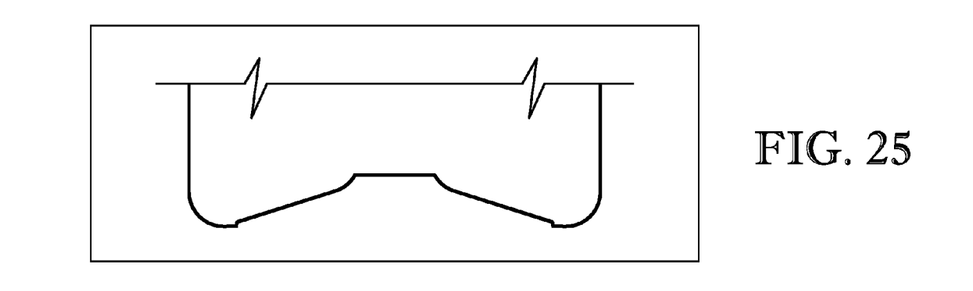
FIG. 25 is a schematic, cross-sectional view of a blow mold base used for comparative testing of prior art stretch rod tips to the stretch rod tip of FIGS. 4-6 of the present invention, the results of which are set forth in Example 3.

For Example 3, the blow mold base 20, illustrated in FIG. 25, included a shallow, slightly conical dome with an approximate 12.7 mm diameter flat recess around the sprue. Twenty bottles were formed using each of Tips 1 and 2. The bottles were tested according to the Bruceton Staircase Method, ASTM D2463 to determine an $F_{50}$ failure height. For the twenty bottles formed using Tip 1, the bottles had an average $F_{50}$ of approximately 1.9 m. For the twenty bottles formed using Tip 2, the bottles had an average $F_{50}$ of at least approximately 3 m, which is the limit of the drop test apparatus used.

For Example 4, the blow mold base 20, similar to that illustrated in FIG. 24, included a shallow, spherical dome. Twenty bottles were formed using each of Tips 1 and 2. The bottles were tested according to the Bruceton Staircase Method, ASTM D2463 to determine an $F_{50}$ failure height. For the twenty bottles formed using Tip 1, the bottles had an average $F_{50}$ of approximately 0.5 m. For the twenty bottles formed using Tip 2, the bottles had an average $F_{50}$ of 2.1 m.

Although the invention has been described with reference to the embodiments illustrated in the attached drawing figures, it is noted that equivalents may be employed and substitutions made herein without departing from the scope of the invention as recited in the claims. For example, embodiments of the present invention provide for a vent 78 in the stretch rod tip 22 that comprises an opening 80 connecting the hollowed area 32 to atmosphere, as illustrated in FIGS. 21-22. The vent 78 allows for venting of air trapped in the hollowed area 32 after the received preform 36 has been received therein. As the stretch rod tip 22 presses against the softened preform 16, and the received preform 36 is received into the hollowed area 32, the pressure may increase within the hollowed area 32 and become significant enough to adversely affect the molding process. The vent 78 thus allows release of any excess pressure to atmosphere.

It is also to be understood that embodiments of the present invention contemplate that the sprue 38 may be at least partially deformed during the stretch blow molding. However, the sprue 38 is not so severely compressed so as to flatten the sprue 38 against an outside surface of the container and leave a vulnerable notch, as in the prior art.

The preferred forms of embodiments of the present invention described above are to be used as illustration only and should not be used in a limiting sense to interpret the scope of the present invention. Modifications to the exemplary embodiments, set forth above, could be readily made by those skilled in the art without departing from the spirit of embodiments of the present invention.

The invention claimed is:

1. A stretch blow molding process comprising:
   (a) inserting a stretch rod into a preform through a neck of said preform;
   (b) stretching said preform with said stretch rod to thereby cause a generally lower end of said preform to contact a base of a mold;
   (c) pressing a tip of said stretch rod against said generally lower end of said preform to thereby deform said preform and cause a portion of said preform to form a protective dome that is received within a hollowed area of said tip, wherein the received portion of said preform does not entirely till said hollowed area of said tip at any point during said stretch blow molding process; and
   (d) injecting pressurized air into said preform to thereby force said preform to take the shape of said mold.

2. The process of claim 1, wherein said pressing of step (c) causes a sprue depending from said generally lower end of said preform to be at least partially compressed into said preform.

3. The process of claim 2, wherein during said pressing of step (c) at least a portion of said sprue is received within said hollowed area Of said tip.

4. The process of claim 3, wherein upon completion of said stretch blow molding process the received portion of said preform provides said protective dome over the received portion of said sprue.

5. The process of claim 4, wherein said hollowed area of said tip is defined by an interior wall that only partially contacts said dome during said stretch blow molding process.

6. The process of claim 5, wherein the portion of said interior wall that contacts said preform during said blow molding process is angled from vertical so as to facilitate release of the received portion of said preform from said hollowed area.

7. The process of claim 6, wherein the portion of said interior wall that contacts said preform during said blow molding process forms at least a 5 degree angle with vertical.

8. The process of claim 6, wherein the portion of said interior wall that contacts said preform during sad blow molding process forms a 15 to 45 degree angle with vertical.

9. The process of claim 1, wherein said hollowed area of said tip has a maximum height ($H_3$) and a maximum diameter ($D_2$), wherein the $H_3:D_2$ ratio of said hollowed area is at least 0.4:1.

10. The process of claim 9, wherein the $H_3:D_2$ ratio of said hollowed area is at least 0.6:1.

11. The process of claim 9, wherein the $H_3:D_2$ ratio of said hollowed area is at least 0,8:1.

12. The process of claim 1, wherein said tip of said stretch rod comprises a rim that contacts said preform during said pressing of step (C), wherein the edges of said rim are rounded.

13. The process o claim 12, wherein the edges of said rim have a minimum radius of curvature (R) of at least 0.1 millimeters.

14. The process of claim 12, wherein the edges of said rim have a minimum radius of curvature (R) of at least 0.2 millimeters.

15. The process of claim 1, wherein said preform comprises a sprue depending from said generally lower end, wherein said hollowed area has a maximum diameter ($D_2$) that is larger than the diameter of said sprue.

16. The process of claim 1, wherein said tip of said stretch rod has a tip diameter ($D_1$), wherein said hollowed area has a hollowed area diameter ($D_2$), wherein said tip exhibits a D2:D1 ratio of at least 5:8.

17. The process of claim 1, wherein prior to the deformation of said preform caused by said pressing of step (c), no portion of said preform is received in said hollowed area.

18. The process of claim 1, wherein said pressing of step (c) causes at least a portion of said, preform to be deformed and pressed into said hollowed area of said tip.

19. The process of claim 18, wherein said preform comprises a sprue depending from said generally lower end, wherein said pressing of step (c) causes at least a portion of said sprue to be deformed and pressed into said hollowed area of said tip.

20. The process of claim 19, wherein the volume of said hollowed area is at least 10 percent greater than the combined volume of the portion of said preform and sprue received in said hollowed area during said pressing.

* * * * *